United States Patent
Marzorati et al.

(10) Patent No.: US 12,103,544 B2
(45) Date of Patent: Oct. 1, 2024

(54) CONTROLLING AUTONOMOUS VEHICLE FUNCTIONS

(71) Applicant: KYNDRYL, INC., New York, NY (US)

(72) Inventors: Mauro Marzorati, Lutz, FL (US); Cesar Augusto Rodriguez Bravo, Alajuela (CR); Roxana Monge Nunez, Pérez Zeledón (CR); Raghuram Srinivasan, Aurora, IL (US)

(73) Assignee: Kyndryl, Inc., New York, NY (US)

(\*) Notice: Subject to any disclaimer, the term of this patent is extended or adjusted under 35 U.S.C. 154(b) by 392 days.

(21) Appl. No.: 17/645,793

(22) Filed: Dec. 23, 2021

(65) Prior Publication Data

US 2023/0202490 A1     Jun. 29, 2023

(51) Int. Cl.
*B60W 50/00*  (2006.01)
*B60W 40/08*  (2012.01)
(Continued)

(52) U.S. Cl.
CPC ........ *B60W 50/0098* (2013.01); *B60W 40/08* (2013.01); *B60W 60/0013* (2020.02);
(Continued)

(58) Field of Classification Search
CPC ............. B60W 50/0098; B60W 40/08; B60W 60/0013; B60W 2050/0022;
(Continued)

(56) References Cited

U.S. PATENT DOCUMENTS

2006/0122741 A1\*  6/2006  Bassiere ............... G06F 9/4806
                                                          701/1
2016/0080500 A1\*  3/2016  Penilla .............. B60W 50/0098
                                                          709/226
(Continued)

FOREIGN PATENT DOCUMENTS

CN            110573978 A       12/2019

OTHER PUBLICATIONS

"Limousine & Town Car Services in the US", IBISWorld, updated Sep. 29, 2021, 8 pgs. Retrieved on Dec. 13, 2021 from Internet URL: https://www.ibisworld.com/united states/market-research-reports/limousine-town-car-services-industry/.

(Continued)

*Primary Examiner* — Yonel Beaulieu
(74) *Attorney, Agent, or Firm* — CANTOR COLBURN LLP; Erik Swanson

(57) ABSTRACT

Controlling autonomous vehicle (AV) functions includes receiving occupant identification data from device(s) of an AV and identifying occupant(s) of the AV based on the received occupant identification data, determining a respective prioritization level for each occupant of the occupant(s), the prioritization level for each occupant dictating priority of the AV in performing commands provided to the AV by that occupant to control AV functions, receiving, from an occupant, input of a command for performance by the AV to control a function of the AV, determining whether to perform the command to control the function of the AV based on the prioritization level for the occupant, and performing processing based on the determining whether to perform the command.

17 Claims, 7 Drawing Sheets

(51) Int. Cl.
*B60W 60/00* (2020.01)
*G06N 20/00* (2019.01)

(52) U.S. Cl.
CPC ..... *G06N 20/00* (2019.01); *B60W 2050/0022* (2013.01); *B60W 2540/043* (2020.02); *B60W 2540/047* (2020.02); *B60W 2540/227* (2020.02); *B60W 2556/10* (2020.02)

(58) Field of Classification Search
CPC ..... B60W 2540/043; B60W 2540/047; B60W 2540/227; B60W 2556/10; B60W 2420/403; B60W 60/00; B60W 2420/54; G06N 20/00; G06N 3/08
See application file for complete search history.

(56) References Cited

U.S. PATENT DOCUMENTS

| 2016/0288796 | A1 | 10/2016 | Yuan | |
|---|---|---|---|---|
| 2017/0323639 | A1* | 11/2017 | Tzirkel-Hancock | ........................ B60H 1/00757 |
| 2020/0210905 | A1* | 7/2020 | Scicluna | ................ G06Q 50/40 |
| 2021/0074144 | A1* | 3/2021 | Abe | ......................... G08B 3/10 |
| 2021/0149397 | A1* | 5/2021 | Shin | .................... G06V 10/764 |

OTHER PUBLICATIONS

"Uber Revenue and Usage Statistics", BuildFire, 21 pgs. Retrieved on Dec. 13, 2021 from Internet URL: https://buildfire.com/uber-statistics/.

Mell, Peter, et al., "The NIST Definition of Cloud Computing", NIST Special Publication 800-145, Sep. 2011, Gaithersburg, MD, 7 pgs.

* cited by examiner

CONTROLLING AUTONOMOUS VEHICLE FUNCTIONS

BACKGROUND

Autonomous vehicles (AVs) are capable of navigating between points without substantial human intervention. They may use a variety of technologies such as LIDAR (light detection and ranging), RADAR (radio detection and ranging), GPS (Global Positioning System), and sensor devices such as stereoscopic cameras, ultrasonic sensors, and infrared sensors, as examples, to perceive their surroundings and navigate to destinations. AV operation generally occurs within a connected environment including vehicle-to-vehicle, vehicle-to infrastructure, and infrastructure-to-infrastructure communications. As AVs, their functions, and devices thereof become numerous and more intelligent than ever, new ways of accessing and controlling them can enable users to benefit from their added value.

SUMMARY

Shortcomings of the prior art are overcome and additional advantages are provided through the provision of a computer-implemented method. The method receives occupant identification data from device(s) of an autonomous vehicle (AV) and identifies occupant(s) of the AV based on the received occupant identification data. The method, based on identifying the occupant(s) of the AV, determines a respective prioritization level for each occupant of the occupant(s) of the AV. The prioritization level for each occupant dictates priority of the AV in performing commands provided to the AV by that occupant to control AV functions. The method also receives, from an occupant of the occupant(s) of the AV, input of a command for performance by the AV to control a function of the AV. The method determines whether to perform the command to control the function of the AV based on the prioritization level for the occupant. Then the process performs processing based on the determining whether to perform the command.

Further, a computer system is provided that includes a memory and a processor in communication with the memory, wherein the computer system is configured to perform a method. The method receives occupant identification data from device(s) of an autonomous vehicle (AV) and identifies occupant(s) of the AV based on the received occupant identification data. The method, based on identifying the occupant(s) of the AV, determines a respective prioritization level for each occupant of the occupant(s) of the AV. The prioritization level for each occupant dictates priority of the AV in performing commands provided to the AV by that occupant to control AV functions. The method also receives, from an occupant of the occupant(s) of the AV, input of a command for performance by the AV to control a function of the AV. The method determines whether to perform the command to control the function of the AV based on the prioritization level for the occupant. Then the process performs processing based on the determining whether to perform the command Yet further, a computer program product including a computer readable storage medium readable by a processing circuit and storing instructions for execution by the processing circuit is provided for performing a method. The method receives occupant identification data from device(s) of an autonomous vehicle (AV) and identifies occupant(s) of the AV based on the received occupant identification data. The method, based on identifying the occupant(s) of the AV, determines a respective prioritization level for each occupant of the occupant(s) of the AV. The prioritization level for each occupant dictates priority of the AV in performing commands provided to the AV by that occupant to control AV functions. The method also receives, from an occupant of the occupant(s) of the AV, input of a command for performance by the AV to control a function of the AV. The method determines whether to perform the command to control the function of the AV based on the prioritization level for the occupant. Then the process performs processing based on the determining whether to perform the command.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Described herein are approaches to add intelligence to services and functions provided by environments, such autonomous vehicles (AVs) and close gaps between functionality and technical adoption/transition, while meeting user satisfaction goals. Technology gaps exist in user-control of automated functions. User can currently provide utterances to automate the execution of various functions (commands) but there is no effective prioritization of the execution of such commands based on user ranking/hierarchy/priority (collectively referred to herein as 'ranking' or 'rank'). As one example in the context of a command for performance/execution by an AV to control a function of the AV, for instance to control the vehicle's climate system, ownership of the vehicle is not taken into account when determining to perform a requested a change to the cabin climate of the AV. In the case that a passenger riding in the back seat requests a change in the vehicle's interior temperature (which affects all passengers), the control component of the AV that performs the requested command does not consider that the owner may be the passenger to have the ultimate say over the vehicle's climate settings. The owner may prefer that his/her preference not be trumped by another passenger's command.

An AV is any vehicle substantially operated by computer(s), even if some human input is allowed or even required to drive the vehicle. As used herein, AV should not be taken to necessarily imply any particular minimum SAE J3016 level of automation, may rely on artificial aids in their environment, such as magnetic strips, may be at least partially controlled via communication network(s) both in the immediate vicinity (for collision avoidance, for example) and/or farther away (for congestion management, for instance), includes 'automated vehicles' that are not fully independent (often termed 'semi-autonomous').

Figure 1:
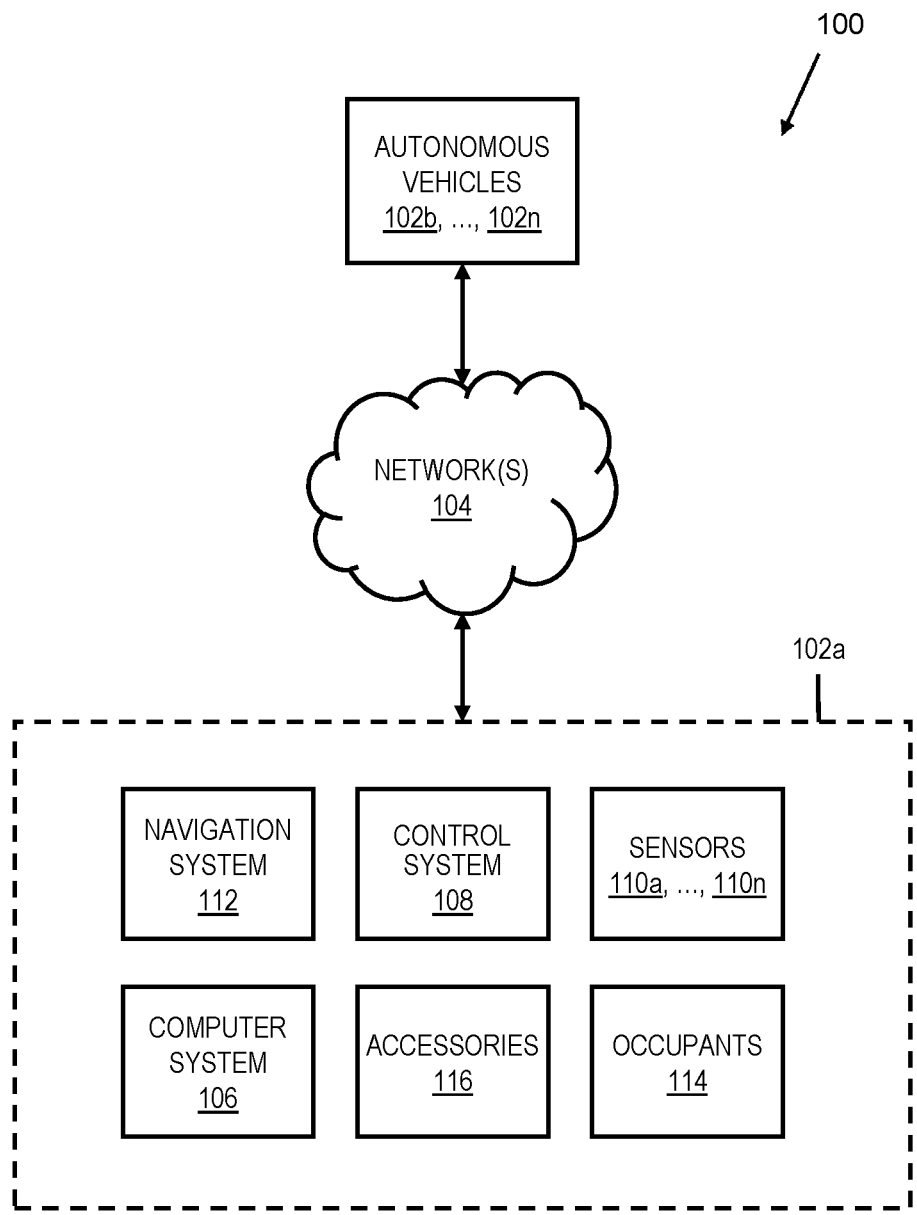
FIG. 1 depicts an example autonomous vehicle environment to incorporate and/or use aspects described herein.

FIG. 1 depicts an example autonomous vehicle environment to incorporate and/or use aspects described herein. The environment 100 includes autonomous vehicles 102a, 102b, . . . , 102n in communication with each other over one or more communications network(s) 104. AV 102a is configured, in accordance with aspects described herein, to identify vehicle occupants, receive directives from occupants to control operation, function, and other aspects of AV use, and execute/enforce these directives as appropriate. Directives from users/occupants can be in any of varying forms, including commands, also referred to herein as instructions. They could include utterances from the users received from sensors such as audio (microphone), optical (camera), or other types of sensors, or from other devices/sources, such as user mobile devices via software applications, or cloud server(s), as examples.

An AV can execute functions and set various settings and controls based on such directives. The particular settings/functions available for user-input-based control can vary across AVs. Examples include, but are not limited to, controls/functions of opening and closing windows and doors, locking and unlocking doors, multimedia (audio/video) device settings such as volumes and play selections, climate (air conditioning/heat) control, 'infotainment' settings, prioritization of destination/stops, preferred routes, disabling various drive controls, enabling/disabling lights, calling emergency phone numbers, etc. Many other examples are possible. Additionally, the AV might track and potentially coordinate other aspects of its use, such as seat assignments for vehicle occupants and prohibited activities while in the vehicle.

Example AV 102a includes a computer system 106 (e.g., onboard computer), a control system 108, sensors 110a, . . . , 110n, a navigation system 112 (such as a GPS based navigation system), and occupant(s) 114. Computer system 106, navigation system 112, and control system 108 may include any type of hardware/software based controller system(s) including, inter alia, one or more of an automobile integrated controller computer, a computer (PC), a laptop computer, a tablet, etc. Computer system 106 includes a memory storing program instructions for execution by a processing circuit to perform, and/or communicate with other computer system(s) that perform, aspects described herein. Computer system 106, navigation system 112, and control system 108 may each include specialized hardware device(s) including specialized (non-generic) hardware and circuitry (i.e., specialized discrete non-generic analog, digital, and logic-based circuitry) for executing process described herein. The specialized discrete non-generic analog, digital, and logic-based circuitry may include proprietary specially designed components (e.g., a specialized integrated circuit, such as for example an Application Specific Integrated Circuit (ASIC) designed for only implementing processes described herein. Control system 108 can include any type of electrical and/or mechanical control/switching mechanism for controlling functions, settings, etc. of the AV, such as of accessories 116 in the AV and any devices and functions thereof. Control system 108 could include proprietary, specially designed electro/mechanical components (e.g., circuitry, switching relay, control motors, etc.). In some embodiments, the control system 108 is part of or incorporated in/with computer system 106, or vice versa. Accessories 116 can include any functional accessories of the vehicle such as those for entertainment (radios, multimedia devices, etc.), climate control (air conditioning, heat), seat positioning, door and window control (open/close/up/down), lighting, audio functions, and the like. Sensors 110a, . . . , 110n can include any type of sensors for obtaining or measuring, and providing data, for instance data that conveys environmental context that includes, among other information, properties of AV occupants 114. Sensors 110a, . . . , 110n can include, for example, optical sensors, audio sensors, occupancy sensors, position sensors, temperature sensors, infrared sensors, thermal imaging sensors, speed sensors, GPS sensors, altimeters, proximity sensors, moisture sensors, pressure sensors, motion detector sensors, video cameras, biometric sensors (e.g., heart rate sensors, blood pressure sensors, etc.), wearables on occupants within the AV, sensors within a seat or other component of the AV, and the like.

In accordance with some aspects described herein, provided are methods and systems that prioritize control commands emitted/provided/input by users to AVs, where such prioritization is based on prioritization levels for those users. The prioritization levels provide any relevant information for a system to determine whether to perform a command, input by the user, for performance by the AV to control a function of the AV. The prioritization level of a user can inform of priority, privilege, authority, and the like, that the system uses to determine whether to perform the command. Whether to perform the command can be based the prioritization level of the inputting user, as an occupant of the AV, and optionally the prioritization level(s) of other users. Those other users may or may not currently occupy the vehicle at the time of the input command. In examples, a user's prioritization level is informed by the user's position in a hierarchy.

A determination and identification of characteristics of AV occupants (passengers) is used to inform prioritization levels for the occupants, and such characteristics can be internal/intrinsic characteristics (such as the unique identity of the person or the person's rank or title within an organization, as examples) as well as behavioral (such as where the user is positioned/assigned in the AV or the actions/reactions of the user in the AV, as examples). In this manner, occupant identification and other data can be used in determining a prioritization level for the user. The prioritization level may or may not be the same as a prioritization level of other users. For instance, in a family of five individuals with two parents and three children, the prioritization levels may be unique (1, 2, 3, 4, 5). Alternatively, the levels may be based on grouping, classification, or rank, where, for instance, the prioritization level of each of the two parents is the same (e.g. 1) and the prioritization level of each of the three children is the same (e.g. 4). In yet another example, prioritization levels are a combination of unique and group based, for instance where the parents are classified at a "High" prioritization level but one parent's High prioritization level is greater privileged than the other parent's High prioritization level, the oldest child, a teenager, has a "Medium" prioritization level, and the two youngest children are classified at a "Low" prioritization level with the older of the two youngest children having a "Low" prioritization level that is greater privileged than the youngest child's "Low" prioritization level.

The prioritization level for a user can be used in the control of command performance and other coordination in which the AV may be involved. In some aspects, the prioritization level corresponds to an authority of the user/occupant to trigger some actions and/or privileges afforded the user (such as precedence in seat assignment/selection). The prioritization level can correspond to an absolute priority/privilege or a priority/privilege that is relative to other users (who may or may not be an occupant at that time). A function, such as overriding the AV's navigation system to specify an alternate route, might require some minimum prioritization level under all circumstances. This would prevent, for example, young child with a relative low prioritization level from issuing a command to reroute the AV. Other functions might be available depending on how the requesting user's prioritization level compares to prioritization levels of others, such as other occupants of the vehicle at that time. For example, the musical preference of a parent might trump the musical preference of the parent's child when the parent is in the vehicle. The system might therefore reject the child's command to invoke a certain genre of music while that parent is in the vehicle but otherwise allow the command and perform the function of playing that genre music if the parent is not a current occupant of the AV, for instance if the child is riding alone. As noted, example settings/functions available for control (subject to prioritization levels) could include, but are not limited to, controls/functions of opening and closing windows and doors, locking and unlocking doors and windows, multimedia (audio/video) device settings such as volumes and play selections, interior climate (air conditioning/heat) control, 'infotainment' settings, prioritization or selection of destinations/routes, preferred routes, disabling various drive controls, enabling/disabling lights, calling emergency phone numbers, etc., as well as other coordinated aspects of AV use, such as seat assignments for vehicle occupants and prohibited activities (eating food, singing, playing with mobile gaming consoles, etc.) while in the vehicle.

It is also noted that the prioritization level for the user could be function-specific, meaning that the prioritization level for the user relative to a command to perform one function could vary from the prioritization level for the user relative to a command to perform another, different function. In this manner, one user may have a greater priority/privilege than another user relative to a first function, such as music selection, but lesser priority/privilege than the other user relative to a second function, such as navigation.

In some aspects, a system, such as a computer system of the AV or another computer system in communication with a computer system of the AV, receives data from devices of the AV, such as devices provided as part of the AV and/or devices that travel with the AV, such as user mobile devices, wearables, etc. Example such data and devices for input include video and audio data from camera/microphone devices (useful for facial/audio-based recognition of users, user utterance capture, physical positioning and other user activity, etc.), wearable device data from user wearables (also useful for user identification and user activity), and sensor data from sensors detecting environmental context (useful for detecting user positions, repositions, movements, actions and reactions, compliance with directions, etc.).

At least some of the data may be occupant identification data, which is data used to identify occupants. A process can identify occupant(s) of the AV based on the received occupant identification data. Example occupant identification data includes, for instance, video data captured by a camera of the AV. The video data can include image(s) of an occupant, captured by camera(s), and used for recognizing and identifying the user through facial and/or other recognition techniques. Another example of identification data is voice data received from a microphone of the AV from voice input by the occupant to a microphone provided either with/in the AV itself, for instance a ceiling mounted microphone, or in a device possessed by the occupant. Biometric and other data obtained via sensor(s) or otherwise could also be used in the identifying of AV occupants, for instance using mobile-device-based near-field communication (NFC) tap technology to learn an occupant's identity. In general, the identifying attempts to identify each occupant, and this could be based on retained identity data of known users. For instance, the computer system could perform, or leverage a backend to perform, some processing that identifies a user (such as facial recognition on an entering user) and performs a lookup to uniquely identify the user based on a database of users, profiles, or the like. In this manner, the AV can identify each occupant and obtain an associated collection of data, such as a profile, of that occupant to obtain/inform a prioritization level for that occupant.

Thus, based on identifying the occupant(s) of the AV, a process could determine a respective prioritization level for each occupant. The prioritization level for each occupant dictates a priority of the AV in performing commands provided to the AV by that occupant to control AV functions. As noted, the priority could refer to (i) priority of that user relative to other users, where the user is generally allowed to invoke the function unless explicitly or implicitly denied on account of the preference of a higher prioritization level user, (ii) priority of the user in terms of having a high enough prioritization level that it meets some minimum needed to invoke the function regardless what other occupant preferences may be, and/or (iii) a combination of the foregoing, as examples.

In any case, inputs to the system can be synthesized into a prioritization level for each user based on any of varying factors. In a specific example described herein, recognition of an occupant leads identifies a user profile upon which the prioritization level is determined (obtained, computed, output from a classification, etc.).

In specific examples, determining the prioritization level for an occupant includes identifying a hierarchical ranking of the occupant relative to other individuals in a hierarchy, and the determined prioritization level for that occupant is dictated by the identified hierarchical ranking. An example such hierarchical ranking can be or include a ranking of the occupant within a social or familial hierarchy, such as a social circle, or a family unit (e.g. parent, child, extended family). Another example hierarchical ranking can be or include a ranking of the occupant within an organizational hierarchy, such as an occupational organization (boss, employee) or educational organization (professor, student). Yet another hierarchical ranking could be based on commercial services or offerings that the occupants may or may not subscribe to (for instance a premium plan participant vs. a free/non-premium plan participant). Additionally or alternatively, prioritization level for an occupant of the AV can be based at least in part on a position of the occupant in the AV, as explained in further detail below.

The prioritization levels of users (current or former occupants, or other uses of the system) can be used in controlling command performance and other coordination. Thus, aspects can control how the AV handles input commands from users, for instance commands that control function(s) of the AV. As an example, a system receives, from an occupant of the AV, input of a command for performance by the AV to control a function of the AV and determines whether to perform the command to control the function of the AV, where the determination whether to perform the command is based on a prioritization level for at least the occupant, and possibly other prioritization levels of other occupants. Then the system can perform processing based on whether to perform the command. As an example, the process can invoke/undertake performance of the command, or can discard/ignore/reject the command, and then processing proceed to a next step, such as awaiting input of a next command.

Seat assignments may be made by the AV based on the prioritization levels of occupants. By way of specific example, the AV acquires occupant identification data in the form of facial images of three occupants entering the AV and then identifies them as employees of company C. Further, the AV identifies one such occupant-employee as the highest-ranking employee of company C. The prioritization level of that occupant is determined to be highest based (at least) on this occupational/organizational hierarchy, and consequently the AV assigns the best or preferred seat of the AV to that employee. By way of another specific example, the AV is a van that drives autonomously around a campus, for instance a university campus, and shuttles occupants to various destinations on campus. A process applies facial recognition to entering users and recognizes occupants as either professors/faculty or students. The process indicates higher prioritization level(s) for professors/faculty than for students. The AV therefore assigns priority seats to faculty and non-priority seats to students.

Seat assignments could also be made based on route-related information, such as the sequence in which occupants are to exit the vehicle based on the route and sequence of stops along the way. The sequence may be based on a routing priority, which itself may be based on prioritization level of the occupants, for instance to travel first to the destination of higher prioritization level occupants.

Additionally or alternatively, occupant position in the AV could be used to inform prioritization levels of the occupants. For instance, certain seating positions in the AV could be identified that provide the occupants in those position higher priority/privilege than the priority/privilege given to occupants of other seating positions. This would enable, for instance, the earlier-entering occupants to select seating positions of higher priority, if desired, and therefore potentially receive higher prioritization levels, than later-entering occupants. The occupant in the 'driver's seat (e.g. front left or front right position of the vehicle) could receive the highest prioritization level, followed by the prioritization level given to any occupants in the other seat(s) in the front of the vehicle, which itself is followed by the prioritization level given to any occupants in rear seating positions, for instance.

It may be assumed, in some examples, that occupants riding in certain position(s) are to be provided greater priority/privilege than occupants riding in other positions. This may be useful in family situations where it may be assumed that adults/parents (to be given higher priority/privilege over some/all functions) sit in the front of the vehicle and children (to be given less priority over some functions/all functions) sit in the back of the vehicle.

As previously noted, hierarchy-based authorization/execution of input commands is possible. Based on a hierarchy and prioritization levels given to members of that hierarchy, the system could evaluate and identify whether/when a requested command is allowed to be executed, for instance whether an input command for performance is allowed to override a previous command. By way of example, if a child in the AV verbally dictates a command to the AV to open a window but the parent previously commanded the AV to close the window or keep the windows closed, then the system can understand that the parent's instruction has greater weight on account of the higher prioritization level for the parent, based on a familial hierarchy. It could then discard the command from the child to open the window and keep the window closed. As a variant of this example, the system could receive as a first instance the command from the child and maintain it in a 'pending' state. Then based on the AV's knowledge that a parent/other occupant of higher prioritization level is currently in the vehicle, the system could prompt that other occupant to confirm whether or not the pending command from the child should be performed to open the window.

Different options exist in terms of whether or not it matters that a requested command conflicts with an existing directive that controls the function to which the requested command pertains. For instance, using the window example, the function to open the window might require a minimum prioritization level of the occupant to perform this command when input by that occupant, regardless of whether or not the command to open the window conflicts with any preference of other occupants. The AV could reject the command attempt by the child simply on the basis that the prioritization level of the child is lower than what is required to command the AV to open the window. Alternatively, the child's command to open the window could be performed as long as another occupant (or other user, such as a parent who remains at home) has not preemptively, or does not subsequently, within a defined amount of time such as 5 seconds, override this command by the child.

It is further noted that if a command is performed at the time it is input by a first occupant of a certain prioritization level, then a later-provided command to change the function or a setting thereof by a second occupant with a prioritization level greater in privilege/priority can be performed to override the earlier command on account of the higher privilege/priority of the second occupant.

Aspects can also incorporate a machine learning mechanism to learn about the types of functions, their related commands, and the specific authority/level for confirmation for invoking each of those. If one occupant requests to change a destination when other occupants are present, the AV might request the occupant with the highest priority/privilege (i.e. as designated by prioritization level) to confirm the change in destination. Any overrides to command either prior performed or attempted to be performed provide feedback for training a machine learning model in terms of what is and is not appropriate or allowed in different contexts. In examples where the system receives, from a first user, a user-provided override to a command that the AV performs or attempts to perform on behalf of a second user (where the prioritization level of the first user is at least at privileged as a prioritization level for the second user), the user-provided override can be used to training the machine learning model, which model could be used in classifying other input commands and identifying prioritization levels necessary for invoking commands to perform functions of the AV. This can aid in the determination as to whether varying commands should be performed in a current context.

Social and other hierarchical rankings, or prioritization levels, can also be determined and/or learned over time, for instance based on overrides or other interactions with the system by users. The system could learn when one user's command is to carry greater weight than another user's command to perform one or more functions, based for example on preconfigured settings and/or ongoing interactions with the users. User profiles in another ecosystem could be used to inform of hierarchical ranks. A parent might maintain a 'family account' profile with a software/hardware ecosystem and the account could have sub-accounts for children and a related account of a spouse. Prioritization levels of those users of the AV could be taken from or based on such profiles and account hierarchy.

A prioritization level of a user could be adjusted over time based on training a machine learning model, for instance using feedback indicative that the prioritization level should be adjusted. The machine learning model could be the same or different from the model above that classifies input commands.

Additionally or alternatively, the system could incorporate processes to handle occupants that are unrecognized or for which prioritization level cannot otherwise be ascertained. In one example, the AV reaches out to an identification system and/or authority to identify an occupant. An example such authority is a server with a company hierarchy to identify an employee-occupant. In another example, the AV requests other occupant(s) to confirm a prioritization level for the unrecognized occupant, for instance by prompting the other occupants to indicate what the prioritization level of the new occupant should be. In a specific embodiment, the identification of an occupant identifies, based on the received occupant identification data, the occupant as an unrecognized occupant, and determining the prioritization level for that unrecognized occupant includes prompting at least one other occupant of the AV to specify a prioritization level for the unrecognized occupant, then selecting the prioritization level for the unrecognized occupant based on the prompting. In examples, the selected prioritization level is what the at least one other occupant dictates. This could be done by majority/consensus voting, for instance, when multiple occupants indicate different prioritization levels. Alternatively, the prompt could be made to the most privileged occupant of the vehicle. In any event, the selected prioritization level could be capped (in terms of privilege/priority), where the selected prioritization level for the unrecognized occupant is necessarily no more privileged than a most privileged prioritization level of the occupants of the AV. This is useful to prevent a situation where a relatively low privileged first occupant promotes an unrecognized second occupant to a relatively high privilege level in order to override restrictions put on the commands/functions that can be performed on behalf of that first occupant.

In some embodiments, the system can learn from cohorts (similarly situated users) for prioritization level determination. For example, the system could learn that, in general, children aged 6-7 years old (an example cohort) are to receive a mid-level (such as "5" or "6" on a scale of 1-10) prioritization level, at which commands by the child for certain functions like opening a locked door while the AV is in motion are automatically disregarded, and a command by the child to adjust climate is necessarily trumped by a command from any adult in the vehicle, as examples. Prioritization level templates could be built to apply to certain groups, cohort, or classes of individuals and serve as a default to use with a new (unrecognized) individual fitting into the group/cohort/class(es) upon which the template was built. The prioritization level for that individual could then be tweaked, for instance as described above over time based on feedback and learning.

Figure 2:
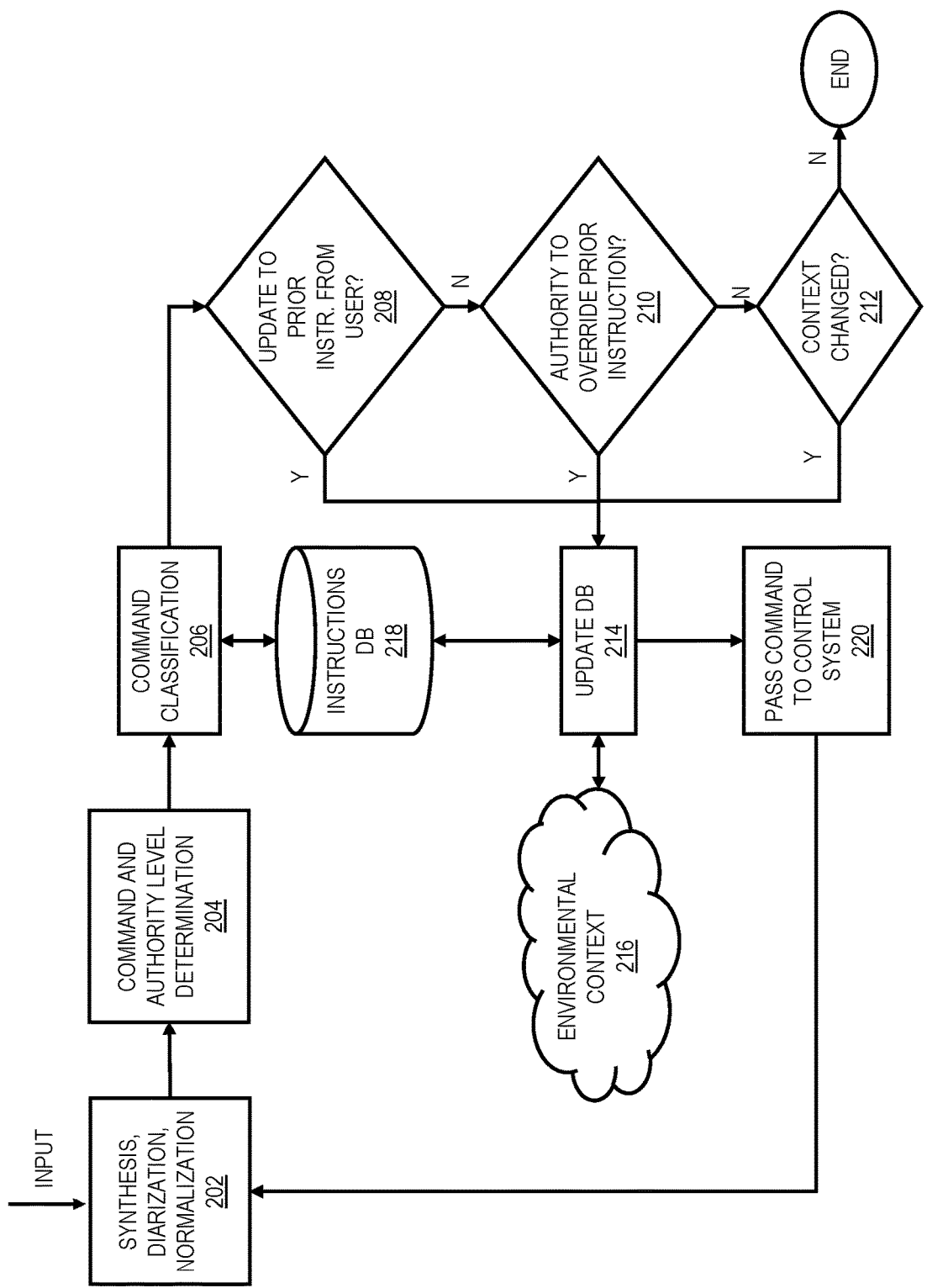
FIG. 2 depicts an example process for processing an input command, in accordance with aspects described herein.

FIG. 2 depicts an example process for command processing in accordance with aspects described herein. The process is performed by one or more computer systems of, or in communication with, the AV. The process could be performed on asynchronously detected/received input commands, such as one provided by a user utterance (audio or other kind) or a command issued from a device, for instance a user's mobile device or by way of user manual interaction with the AV's infotainment system. Input is received and may be preprocessed—in this example through synthesis, diarization, and normalization (202). Based on this preprocessing, the process extracts, identifies, determines, etc. (204) an input command and associated authority level, which corresponds to the prioritization level for the user providing the command. The user may be a vehicle occupant or a user that is not at that time an occupant of the AV and is instead elsewhere, such as a parent at another location or a user to whom the AV is traveling to pick up.

The process proceeds by classifying (206) the determined command. Classification can be performed by a machine learning model, for instance a feedforward neural network taking inputs and synthesizing those through different weights into a net input function that is then provided to an activation function to determine and output classification(s) of the command. An example output of this classification is an identification of a prioritization level associated with the input command (such as a minimum prioritization level required of a user providing the command in order the execute). Additionally or alternatively, the classification can identify whether/how a current environmental context influences whether the AV can perform the input command. The determination of whether to perform the input command can therefore be based on the classification of that command. Command classification can account for safety and other factors that might influence appropriateness of performing a command in various contexts, beyond just the prioritization levels of the users involved. For instance, the classification can account for safety in terms of whether performance of the command is inherently unsafe and should be disallowed. Opening a window of the AV traveling at a high rate of speed may be acceptable if requested by an adult but not a child, while opening a door when traveling at a high rate of speed may be unacceptable as a safety risk no matter the prioritization level of the person who attempts to invoke the command to perform that function. Environmental context encompasses any relevant considerations that may be present at that time, and examples include but are not limited to: number, identity, presence, prioritization levels, preferences, and another other characteristics of AV occupants; current travel conditions (traffic, weather, etc.); navigation, speed, destination information; and safety considerations. As another example of environmental context informing command handling, the vehicle might recognize that it is pouring rain outside and therefore to reject the command of an occupant (or occupants with lower than a threshold prioritization level) to open a window while the rain persists.

The classification model could be trained based on feedback from the instructions database 218 to learn what prioritization level is needed in given situations for a specific command to be performed at the request of the issuing user. Environmental context could additionally/alternatively be used at a later point in the process (e.g. update DB—214) as explained below.

After classifying the command (and assuming the command is not immediately disregarded/rejected at that point), then the determination of whether to perform the command to control the function of the AV includes determining (208)

whether the command attempts to update a prior-permitted command input by the same user/occupant who provided the current command being processed. In these cases, the command may be performed on the basis that it merely updates a prior-allowed command. By way of specific example, the occupant may have previously requested the AV to begin playing classical music, that command may have previously been performed based on the then-current context and prioritization level for that requesting occupant (and potentially the prioritization level(s) of other occupants) to begin playing classical music, and then the occupant might subsequently issue a command to switch to pop music. This is an update to the prior command input by that occupant while the function of that prior command remains 'active' in the sense that classical music is still playing in the vehicle. The AV might therefore regard the incoming command to play pop music as acceptable on account that it merely updates a prior-allowed command.

It is noted that an 'update' to a prior command could be any command that attempts to change, conflict with, or is inconsistent with, the prior command. This may cut across different types of commands that nonetheless inherently constitute an 'update'/change to a current function even though they two functions are not exactly the same. For instance, a command to begin playing a movie on a display of the AV to the rear-passengers might cause the audio provided in the AV to switch to an audio track corresponding to that video and thereby switch the current audio source (e.g. from streaming classical music to playing the audio track of the movie). The command to play the movie may be considered an update to the prior command (play classical music), though the functions controlled by the different commands—play music versus play a movie—are not exactly the same.

If it is determined at 208 that the current command attempts to update a prior command that was input by the occupant (208, Y), then the process proceeds to Update DB (214). Update DB (214) refers to the process of updating the instructions database 218 that logs received instructions/commands as well as the disposal of those commands, for instance whether or not they were performed and any additional related data. Command handling may be logged, which might include indications of environmental context at that time, reasons for accepting/refusing to perform a command, current occupants of the AV at the time of the command and their prioritization levels, and/or any other desired information.

In addition, as noted, the Update DB (214) aspect might leverage current environmental context (216) to contribute to the determination whether to perform the command. This may provide an override to an otherwise acceptable command. For instance, a check could be undertaken to identify that performing the command might be unsafe or that the environmental context has changed such that, although the occupant's prior command was performed and the current command merely updates that (208, Y), the subsequent update to that is nonetheless not to be permitted. By way of specific example of the latter situation, take the example above in which a first occupant initially requests classical music, the request is granted, and then the occupant eventually requests a change to pop music. Assume that a second occupant entered the vehicle between the receipt of these two commands, that the prioritization level of the second occupant is higher than that of the first occupant (at least insofar as it pertains to music selection), and that the system knows, for instance via explicit configuration or machine learning, that the second user dislikes pop music. The entrance of the second occupant is an example of an environmental change that may be considered as part of the determination whether the first user's request to switch to pop music from classical music should be performed. That check could potentially be performed in the classification stage (206) when classifying the command to switch to pop music and/or at the Update DB stage (214).

Returning to 208, if instead it is determined that the command does not attempt to update a prior command input by the occupant (208, N), the process proceeds by determining (210) whether there is priority/privilege/authority to override any relevant prior instruction/command of a different user. By 'override' is meant that the AV function controlled by performing the command being processed attempts a change/override to the AV function controlled by the prior command, which would include any function attempting to be controlled by the current command that would be inconsistent or conflict with the function controlled by the prior command, akin to an 'update' described above. Whether an override is authorized can be based on prioritization levels as explained herein. In examples, if the prioritization level for the occupant issuing the current command being processed is at least at privileged as a prioritization level for the other occupant/user (who provided the old command), then this current command may be performed, as it may be authorized (210, Y) and the process proceeds to Update DB (214). It is noted that as part of 210 there can be an initial determination whether the current command is attempting any override of a prior command/standing instruction in the first place, and if not, the inquiry can be answered in the positive (210, Y). As an example, if there is no audio currently playing and no other user prioritizations that would prevent performance of an occupant's request to play classical music, then this inquiry could be answered in the positive (210, Y) to proceed to Update DB (214).

If instead at 210 it is determined that the current command is attempting an override of a prior command of a different user of higher priority/privilege/authority (210, N), then the process proceeds by determining (212) whether the context (e.g. environmental context 216) has changed in such a way that the current command can be performed anyway. For instance, if a prior instruction to play classical music was provided by a high-prioritization level occupant who subsequently leaves the vehicle, then that departure is a context change. The classical music might remain playing in the AV after the departure pursuant to the prior-submitted command by the now-departed high-prioritization level occupant. If then a remaining occupant with a lower prioritization level requests the AV to play pop music instead, that command is an attempt to override the prior command of a more privileged/priority former occupant. In that case, however, the environmental context has changed such that the prior command of the former occupant can be disregarded and the current command by the lower prioritization level occupant to play pop music could be performed (assuming no other conflicts, for instance a preference against pop music by another high prioritization level occupant that remains in the AV). Accordingly, if there is no context change that would enable the command to otherwise be performed (212, N) the process ends (the command may be rejected, disregarded, ignored, or the like, possibly with some logging to the instructions database 218) or returns to 202 for a next command. Otherwise, the context has changed in a way to allow the command to be performed (subject to any checks in the Update DB (214) aspect), and the process proceeds to Update DB (214).

At Update DB (214), the commands/instructions can be logged to the instructions database 218, which can identify, among other things, active commands, i.e. those which are currently operative to control various functions of the AV at a current point in time. Assuming that at Update DB 214 it is determined to perform the command being processed according to the process of FIG. 2, the process proceeds by passing (220) the command to an appropriate control system of the AV to control the target function, for instance an infotainment system if the function relates to audio in the vehicle, navigation system if the function relates to navigation, or other control system for the door locks is the function relates to locking/unlocking a door. After passing the command (220), the process returns to 202 to await further input and process any next-received command.

The environmental context 216 can be continually monitored for changes thereto. Environmental context can include, inter alia, AV occupancy and AV travel settings, among other parameters that inform context. The determination whether to perform a command, as detailed in examples herein, can therefore further include checking whether a change in the environmental context has occurred that authoritatively dictates whether the AV can perform the command to control the function of the AV.

Additionally, as part of the Update DB (214) and maintaining command history in the instructions database 218, the process can assign weights to commands (both performed and input) as well as decay rates of those weights. Weights/decay rates can be based on environmental context, prioritization levels of occupants, and/or other factors. A weight of a command can be a factor in how authoritative, privileged, or prioritized the command is, particularly for purposes of determining whether it can trump a prior command or be trumped by a later command. The weights of commands can decay over time and eventually 'age out', meaning they no longer carry any weight to prevent a conflicting command from being performed. An input command being processed to determine whether it can be performed could be assigned some base or initial weight for purposes of comparison to other weights. In this manner, one way a prior command might be overridden by a later command is based on the weight of the prior command decaying to below some threshold, which might be a threshold set relative to the later command (such as its weight), a predefined threshold, or some threshold set using another function.

In this manner, weights assigned to commands may be operative to prevent later commands from being executed but those weights can decay over time. This can be used in various situations, including those where a command might otherwise carry some 'permanence' to them that might otherwise permanently prevent certain functions. To illustrate, assume a parent (high prioritization level occupant) specifies that when a teenage child (relatively lower prioritization level occupant) is in the AV with friends and no adult, the music volume in the AV is to remain below a threshold and the AV is not to travel outside of a defined geographic boundary. That is an example command by a user (the parent) to control AV functions regardless of whether the parent is an occupant of the AV. The weight of that command may be particularly 'high', meaning it is difficult to override that with a later command. However, a decay can be applied to that weight so that the command loses its prevention power over time. The decay could be at whatever rate is desired. An example decay is a 100% decay triggered on a particular time or date (such as when that child reaches 18 years of age). In other examples, the decay is gradual with passage of time. The decay function(s) may be applied as a synchronous process.

Decay may be applied in the AV's handling of examples described above, such as when a user exits a vehicle. In that case, the user's preferences as to music, climate, and other functions that may make no sense to further control because the user is no longer an occupant can be decayed by reducing the weight of that user's directives/preferences.

Figure 3:
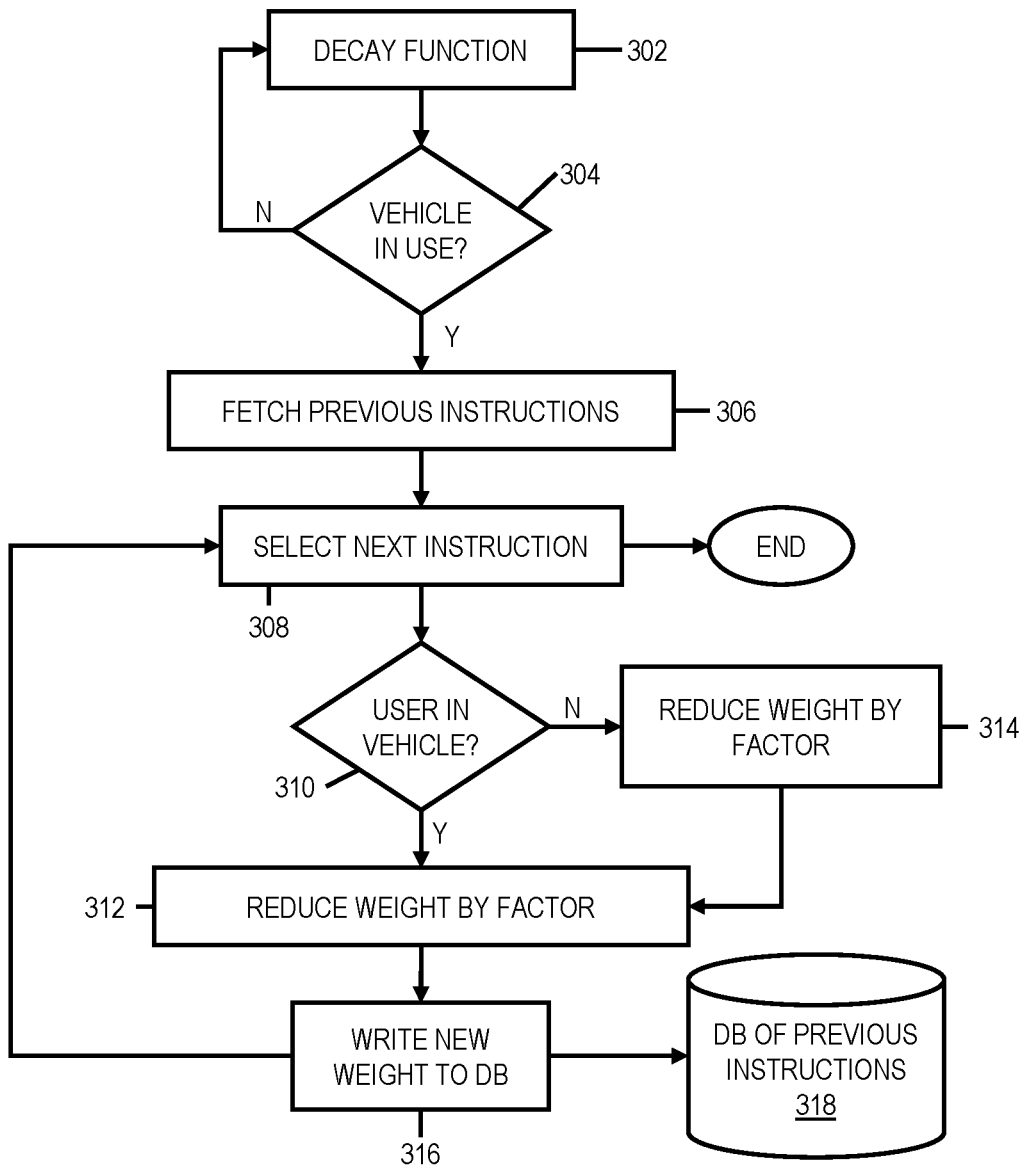
FIG. 3 depicts an example process for decaying weights of commands, in accordance with aspects described herein.

FIG. 3 depicts an example process for decaying weights of commands, in accordance with aspects described herein. In this particular example decay occurs only when the AV is in use, and the weights of commands of a user decay twice as fast when the user is not present. The process is initialized with a decay function 302 and proceeds by determining (304) whether the AV is in use (e.g. occupied by one or more occupants). If not (304, N), the process loops back to inquiry 304 (via 302 in case the decay function is changed). The process loops on this cycle periodically or aperiodically. At some point when the AV is in use (304, Y), the process proceeds by fetching (306) previous instructions, for instance all prior commands with a weight to be decayed. Notably, rejected commands and commands that have decayed below some threshold (such as a zero weight) might be ignored in this fetching.

After fetching the set of instructions with weights to be decayed, the process selects (308) a next instruction and determines (310) whether the user that input that command is currently in the AV. In this example process, the weight of a command by a user currently in the vehicle is decayed slower than if the user is not in the vehicle. Thus, if the user that input the command is currently in the AV (310, Y), the process reduces (312) the weight of that command by a factor, k. In one example, this factor is 50% or a 'half-life'. However, if the user that input the command is not currently in the AV (310, N), then the process reduces the weight of that command by a greater amount, e.g. by reducing the weight by a factor (such as k) at 314 and then proceeding to reduce the weight of that command by a factor (such as k) at 312. The reductions at 314 and 312 may each be by a same factor (k) or different factors. Additionally, the reduction may be performed in a single step as a composite of the two factors rather than two discrete steps, if desired. The factor(s) used in reducing weight can vary by user, command type, and/or any other parameters.

In any case, after reducing the weight, the process proceeds by writing (316) the new weight of the command to a database (318), which could be the instructions database 218 of FIG. 2. The process returns to 308 to select a next instruction of the set fetched by 306. In the event that no such next instruction exists—i.e. all have been processed to reduce their weights in this iteration of the process, then the process ends.

The process to fetch the instructions and reduce their weights can be performed periodically or aperiodically, for instance based on some asynchronous trigger or a time-based trigger, such as every t amount of time. In examples, the process of FIG. 3 is reinitiated, though in other examples the process, instead of ending after 308, proceeds to a loop or other form of delay before proceeding again to 304 to iterate the fetch and weight reduction.

In accordance with aspects of weight decay described herein, a process can maintain a history of prior-performed commands and resulting controls of AV functions based thereon, where the history includes weights assigned to the prior-performed commands. The same or a different process can decay, over time, the weights assigned to the prior-performed commands according to rate(s) of decay (i.e. a function of the factor(s) by which to reduce the weight). The rate of decay of a weight assigned to a prior-performed command input by a user may be lower if the user is present in the AV as compared to if the user is not present in the AV. In this manner, the actual amount by which to decay a weight at a given time can be dynamic depending on whether or not the user is in the AV at the time the reduction is being processed.

The determination of whether to perform a current command input by a user and currently being processed (i.e. by FIG. 2) to control the function of the AV can therefore include determining whether the current command to control the function of the AV attempts to update one or more prior-performed commands (e.g. by another user, at 210), and, if so, comparing a weight of the current command to weight(s) of the one of more prior-performed commands. Based on this comparing, the determination can be made as to whether to perform the current command to control the function of the AV.

Command assertion and deadlock in situations of command conflict or deadlock, such as when conflicting commands are equal weight or the prioritization levels of issuing users is the same, can be managed using any desired approach. As an example, an algorithm could determine based on a mathematical/statical-based ranking could determine which command should be executed first (or override another command), thus breaking the conflict/deadlock scenario.

Figure 4:
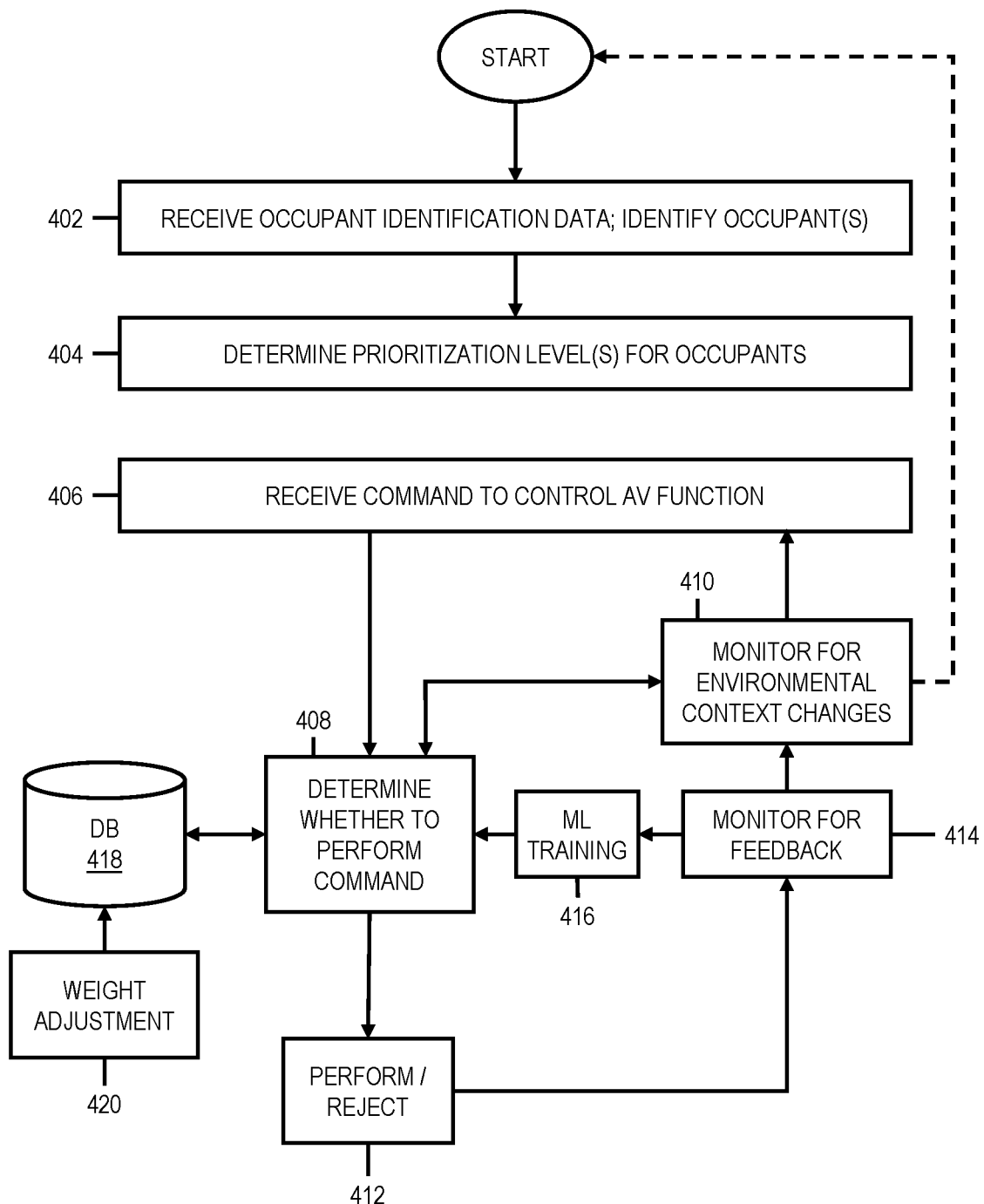
FIG. 4 depicts an example process for handling commands for controlling autonomous vehicle functions, in accordance with aspects described herein.

FIG. 4 depicts an example process for handling commands for controlling autonomous vehicle functions, in accordance with aspects described herein. The process is performed by one or more computer systems, such as those described herein, which may be or include one or more computer systems of or in communication with an autonomous vehicle, one or more cloud servers, and/or one or more other computer systems.

The receives (402) occupant identification data from one or more devices of an autonomous vehicle (AV) and identifies one or more occupants of the AV based on the received occupant identification data. The device(s) of the AV could be onboard devices or other devices that travel with the AV, for instance mobile devices of AV occupants. Occupant identification data could include, as examples, data received from a device of an occupant by a sensor of the AV, voice data received from a microphone of the AV based on voice input by an occupant to the microphone, and video data (e.g. images) captured by a camera of the AV. The occupant identification data can be used in the identification of the occupant(s), for instance via comparison to retained identity data of known users.

The process continues by determining (404), based on identifying the one or more occupants of the AV, a respective prioritization level for each occupant of the one or more occupants of the AV. The prioritization level for each occupant dictates priority of the AV in performing commands provided to the AV by that occupant to control AV functions. AV functions can be any function of the AV that might be controlled. The prioritization level corresponds to a priority, privilege, authority and/or rank used in determining whether to perform a command received from or on behalf of that that occupant.

In embodiments, the determination of the prioritization level for an occupant of the one or more occupants of the AV include identifying a hierarchical ranking of the occupant relative to other individuals in a hierarchy. The determined prioritization level for the occupant is dictated at least in part by that identified hierarchical ranking. As examples, the hierarchical ranking includes a ranking of the occupant within a social, organizational, subscription, and/or familial hierarchy.

In situation where the identifying identifies the occupant as an unrecognized occupant, the process can nonetheless determine a prioritization level for the unrecognized occupant. In examples, it uses a preconfigured default. Alternatively, the process could prompt at least one other occupant of the AV to specify a prioritization level for the unrecognized occupant and then select the prioritization level for the unrecognized occupant based on the prompting and how the prompted occupant(s) respond. The prompted occupant(s) could indicate a prioritization level and the system could select a consensus, average, or other prioritization level for the unrecognized occupant. In any case, the selected prioritization level may be limited to be no more privileged than a most privileged prioritization level of the existing occupants of the AV.

Continuing with the process of FIG. 4, the process receives (406), from an occupant of the one or more occupants of the AV, input of a command for performance by the AV to control a function of the AV. The function of the AV could include (i) route or destination selection or prioritization, (ii) multimedia settings selection, (iii) interior climate settings selection, (iv) door lock or unlock selection, (v) door open or close selection, and/or (vi) window up or down selection, as examples.

The process then determines (408) whether to perform that command to control the function of the AV based on the prioritization level for the occupant. Various factors, including prioritization levels and others, can contribute to the determination whether to perform the command. In some aspects, the process monitors (410) for changes in an environmental context, which environmental context includes at least AV occupancy and AV travel settings, and the determination whether to perform the command can include checking whether a change in the environmental context has occurred that authoritatively dictates whether the AV can perform the command to control the function of the AV.

In further embodiments, determining whether to perform the command to control the function of the AV includes determining whether the command attempts to update a prior command input by the occupant and, if so, determining to perform the command. A new command attempting to update a prior command from that same user may be indicated, at least initially, as being appropriate for performing. Additionally or alternatively, the process can determine whether the command attempts to override a prior command input by another user and, if so, determine whether prioritization level for the occupant is at least at privileged as a prioritization level for the other user whose command might be overridden. The process can determine to perform the command in the case that the prioritization level for the occupant is at least at privileged as a prioritization level for the other user. Additionally or alternatively, the process could determine a weight of the prior command and determine to perform the new command if the weight of the prior command decays to below a threshold (for instance the weight of the new command or a different threshold).

In some examples, the process classifies input commands received from occupants of the AV for performance by the AV to control functions of the AV, which classifying identifies prioritization levels associated with the input commands and how environmental contexts influence whether the AV can perform the input commands. For instance, the classifying can inform prioritization levels needed for the commands themselves, and also be used in tweaking the prioritization levels of individuals. The classifying could classify commands as safety risks depending on the situational context in which they were input. In any case, the determination whether to perform an input command can be based on a classification of the input command.

Based on the determining (at 408) whether to perform the command, the process performs processing accordingly, for instance to accept or reject (412) the command.

In accordance with some embodiments, feedback/overrides are received, in which a first user with a higher prioritization level than a second user overrides a command input by the second user. Many such overrides can be received from more privileged users than those who issued the commands.

Accordingly, the process can monitor (414) for feedback to receive, from a collection of first users, user-provided overrides to commands that the AV performs or attempts to perform on behalf of a collection of second users, where prioritization level of each first user is at least at privileged as prioritization level for a respective second user whose command is being overridden by the user-provided override from the first user. The process can use the user-provided overrides in training (416) a machine learning model. The machine learning model can used in the determining (408) whether to perform received commands (e.g. for instance used in the classifying of the commands), where the model can be configured to identify prioritization levels necessary for invoking commands to perform functions of the AV. As noted, the feedback could also be used in adjusting a prioritization level of a user based on the training. For instance, if a first user frequently corrects a second user's command to open a window, then this might be used for the system to downgrade the prioritization level of the second user, at least in terms of the second user's prioritization level for opening windows of the AV.

The process of FIG. 4 can also maintain in a database (418) a history of prior-performed commands and resulting controls of AV functions based thereon. The history can include weights assigned to the prior-performed commands, and the process can apply weight adjustment (420) to decay, over time, the weights assigned to the prior-performed commands according to rate(s) of decay. The decay rate at any given time can be based in part on whether the occupant who input the command being decayed is in the AV at that time. The rate of decay of a weight assigned to a prior-performed command, of the prior-performed commands, input by a user may be lower if the user is present in the AV as compared to if the user is not present in the AV. In accordance with this approach, the lingering influence of commands that were provided by occupants who are no longer in the AV is decreased faster than if they remain in the AV.

When considering weights, the determination (408) whether to perform a command being processed in FIG. 4 to control the AV function can include determining that the command to control the function of the AV attempts to update one or more prior-performed commands, comparing a weight of the command to one or more weights of the one of more prior-performed commands, and determining based at least on the comparison whether to perform the command to control the function of the AV. For instance, if the weight of the prior command has decayed to below the weight of the command, then it may be determined to perform the command.

In the example of FIG. 4, the process can iterate where, after performing/rejecting a command at 412, the process monitors (414) for feedback and for environmental context changes (410) and returns to 406 to receive a next command to process. In some situations, the process returns to another aspects thereof, for instance back to 402 to receive occupant identification data. This might occur if, for example, another user enters the vehicle.

Although various examples are provided, variations are possible without departing from a spirit of the claimed aspects.

Figure 5:
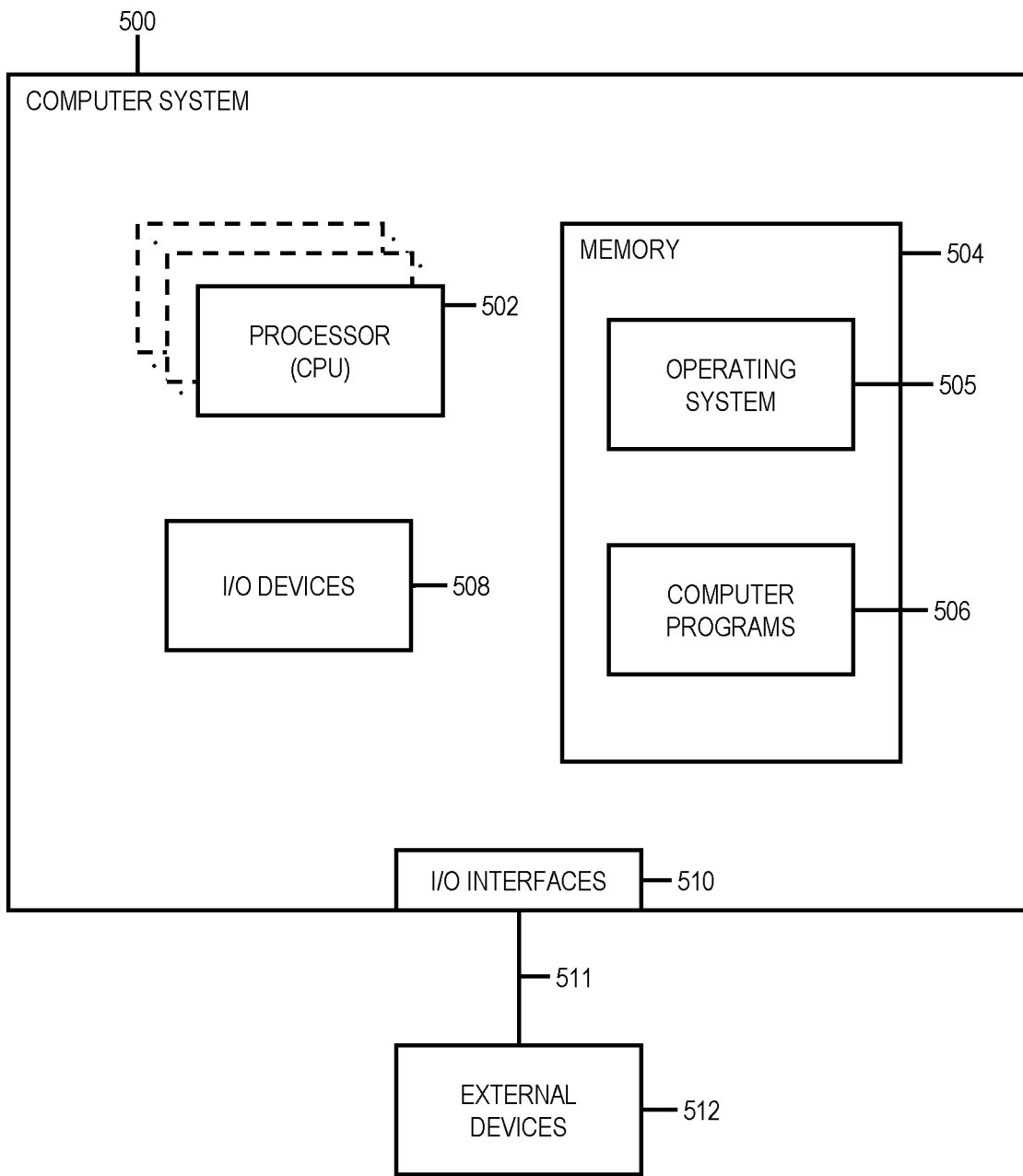
FIG. 5 depicts one example of a computer system and associated devices to incorporate and/or use aspects described herein.

Processes described herein may be performed singly or collectively by one or more computer systems, such as one or more computer systems discussed herein. FIG. 5 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by Intel Corporation (Santa Clara, California, USA) or ARM Holdings plc (Cambridge, England, United Kingdom), as examples.

FIG. 5 shows a computer system 500 in communication with external device(s) 512. Computer system 500 includes one or more processor(s) 502, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 502 can also include register(s) to be used by one or more of the functional components. Computer system 500 also includes memory 504, input/output (I/O) devices 508, and I/O interfaces 510, which may be coupled to processor(s) 502 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 504 can be or include main or system memory (e.g. Random Access Memory) used in the execution of program instructions, storage device(s) such as hard drive(s), flash media, or optical media as examples, and/or cache memory, as examples. Memory 504 can include, for instance, a cache, such as a shared cache, which may be coupled to local caches (examples include L1 cache, L2 cache, etc.) of processor(s) 502. Additionally, memory 504 may be or include at least one computer program product having a set (e.g., at least one) of program modules, instructions, code or the like that is/are configured to carry out functions of embodiments described herein when executed by one or more processors.

Memory 504 can store an operating system 505 and other computer programs 506, such as one or more computer programs/applications that execute to perform aspects described herein. Specifically, programs/applications can include computer readable program instructions that may be configured to carry out functions of embodiments of aspects described herein.

Examples of I/O devices 508 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (512) coupled to the computer system through one or more I/O interfaces 510.

Computer system 500 may communicate with one or more external devices 512 via one or more I/O interfaces 510. Example external devices include a keyboard, a pointing device, a display, and/or any other devices that enable a user to interact with computer system 500. Other example external devices include any device that enables computer system 500 to communicate with one or more other computing systems or peripheral devices such as a printer. A network interface/adapter is an example I/O interface that enables computer system 500 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Washington, U.S.A.).

The communication between I/O interfaces 510 and external devices 512 can occur across wired and/or wireless communications link(s) 511, such as Ethernet-based wired or wireless connections. Example wireless connections include cellular, Wi-Fi, Bluetooth®, proximity-based, near-field, or other types of wireless connections. More generally, communications link(s) 511 may be any appropriate wireless and/or wired communication link(s) for communicating data.

Particular external device(s) 512 may include one or more data storage devices, which may store one or more programs, one or more computer readable program instructions, and/or data, etc. Computer system 500 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 500 may be operational with numerous other general purpose or special purpose computing system environments or configurations. Computer system 500 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), autonomous vehicles, set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
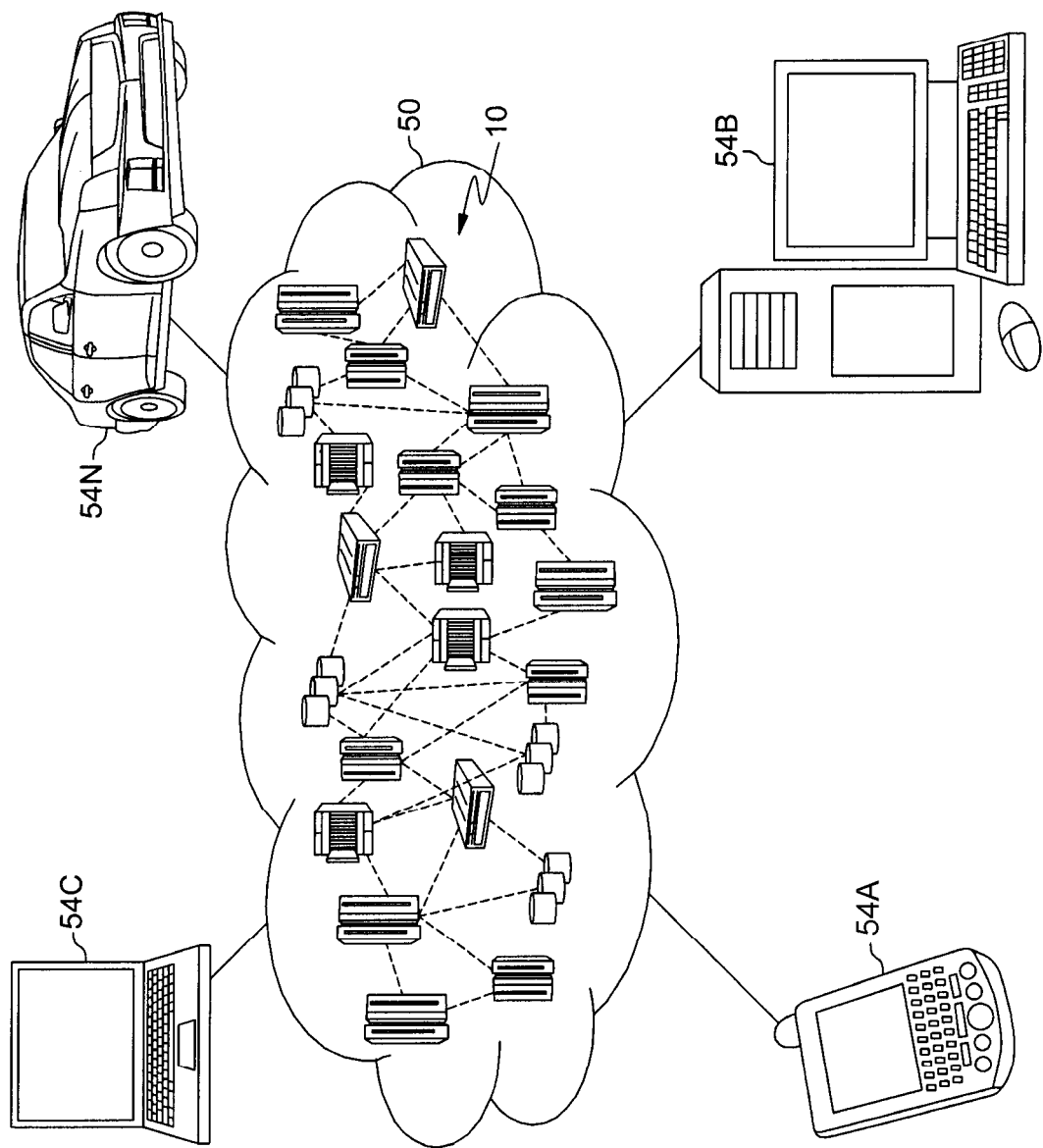
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
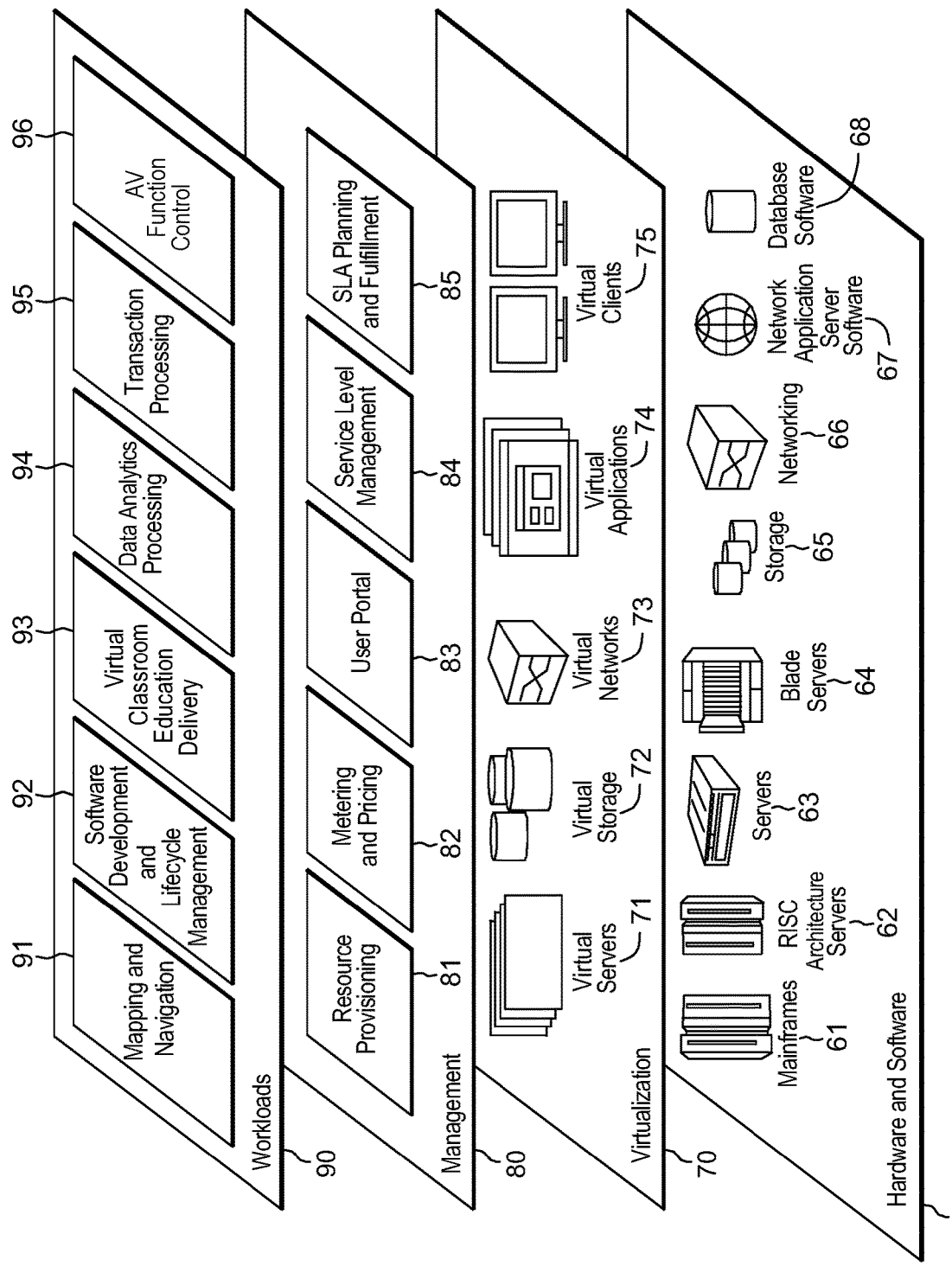
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and AV function control 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
receiving occupant identification data from one or more devices of an autonomous vehicle (AV) and identifying one or more occupants of the AV based on the received occupant identification data;
based on identifying the one or more occupants of the AV, determining a respective prioritization level for each occupant of the one or more occupants of the AV, the prioritization level for each occupant dictating priority of the AV in performing commands provided to the AV by that occupant to control AV functions;
receiving, from an occupant of the one or more occupants of the AV, input of a command for performance by the AV to control a function of the AV;
determining whether to perform the command to control the function of the AV based on the prioritization level for the occupant; and
performing processing based on the determining whether to perform the command;
wherein determining the prioritization level for the occupant of the one or more occupants of the AV comprises identifying a hierarchical ranking of the occupant relative to other individuals in a hierarchy, wherein the determined prioritization level for the occupant is dictated at least in part by the identified hierarchical ranking, and wherein the hierarchical ranking comprises a ranking of the occupant selected from an organizational hierarchy or a familial hierarchy.

2. The method of claim 1, wherein the occupant identification data comprises at least one selected from the group consisting of:
data received from a device of an occupant by a sensor of the AV;
voice data received from a microphone of the AV based on voice input by an occupant to the microphone; and
video data captured by a camera of the AV, the video data comprising one or more images, of an occupant, captured by the camera; and
wherein the identifying attempts to identify the occupant based on retained identity data of known users.

3. The method of claim 1, wherein the ranking of the occupant is further selected from a social hierarchy or a subscription hierarchy.

4. The method of claim 1, wherein the determination of the prioritization level for an occupant of the one or more occupants of the AV is based at least in part on a position of the occupant in the AV.

5. The method of claim 1, wherein the function of the AV comprises at least one selected from the group consisting of: (i) route or destination selection or prioritization, (ii) multimedia settings selection, (iii) interior climate settings selection, (iv) door lock or unlock selection, (v) door open or close selection, and (vi) window up or down selection.

6. The method of claim 1, wherein the determining whether to perform the command to control the function of the AV comprises one selected from the group consisting of:
based on determining that the command attempts to update a prior command input by the occupant, determining to perform the command; and
based on determining that the command attempts to override a prior command input by another user, determining to perform the command based on at least one selected from the group consisting of:
(i) the prioritization level for the occupant being at least at privileged as a prioritization level for the another user; and
(ii) a weight of the prior command decaying to below a threshold.

7. The method of claim 1, wherein the method further comprises monitoring for changes in an environmental context, the environmental context comprising at least AV occupancy and AV travel settings, and wherein the determining whether to perform the command further comprises checking whether a change in the environmental context has occurred that authoritatively dictates whether the AV can perform the command to control the function of the AV.

8. The method of claim 1, further comprising classifying input commands received from occupants of the AV for performance by the AV to control functions of the AV, the classifying identifying prioritization levels associated with the input commands and how environmental contexts influence whether the AV can perform the input commands, wherein determining whether to perform an input command of the input commands is based on a classification of the input command.

9. The method of claim 8, further comprising:
receiving, from a collection of first users, user-provided overrides to commands that the AV performs or attempts to perform on behalf of a collection of second users, wherein a prioritization level of each first user is at least at privileged as a prioritization level for a respective second user whose command is being overridden by the user-provided override from the first user; and
using the user-provided overrides in training a machine learning model, the machine learning model being used in the classifying and being configured to identify prioritization levels necessary for invoking commands to perform functions of the AV.

10. The method of claim 9, further comprising adjusting a prioritization level of a user based on the training.

11. The method of claim 1, wherein the identifying identifies, based on the received occupant identification data, another occupant, of the one or more occupants of the AV, as an unrecognized occupant, and wherein determining the prioritization level for the unrecognized occupant comprises:
prompting at least one other occupant of the AV to specify a prioritization level for the unrecognized occupant; and selecting the prioritization level for the unrecognized occupant based on the prompting, wherein the selecting selects the prioritization level for the unrecognized occupant to be no more privileged than a most privileged prioritization level of the one or more occupants of the AV.

12. The method of claim 1, further comprising:

maintaining a history of prior-performed commands and resulting controls of AV functions based thereon, the history comprising weights assigned to the prior-performed commands; and decaying, over time, the weights assigned to the prior-performed commands according to one or more rates of decay, wherein a rate of decay of a weight assigned to a prior-performed command, of the prior-performed commands, input by a user is lower if the user is present in the AV as compared to if the user is not present in the AV.

13. The method of claim 12, wherein the determining whether to perform the command to control the function of the AV comprises:

determining that the command to control the function of the AV attempts to update one or more prior-performed commands;

comparing a weight of the command to one or more weights of the one of more prior-performed commands; and based on the comparing, making the determination whether to perform the command to control the function of the AV.

14. A computer system comprising:

a memory; and a processor in communication with the memory, wherein the computer system is configured to perform a method comprising:

receiving occupant identification data from one or more devices of an autonomous vehicle (AV) and identifying one or more occupants of the AV based on the received occupant identification data;

based on identifying the one or more occupants of the AV, determining a respective prioritization level for each occupant of the one or more occupants of the AV, the prioritization level for each occupant dictating priority of the AV in performing commands provided to the AV by that occupant to control AV functions;

receiving, from an occupant of the one or more occupants of the AV, input of a command for performance by the AV to control a function of the AV;

determining whether to perform the command to control the function of the AV based on the prioritization level for the occupant; and performing processing based on the determining whether to perform the command;

wherein determining the prioritization level for an occupant of the one or more occupants of the AV comprises identifying a hierarchical ranking of the occupant relative to other individuals in a hierarchy, wherein the determined prioritization level for the occupant is dictated at least in part by the identified hierarchical ranking, and wherein the hierarchical ranking comprises a ranking of the occupant selected from an organizational hierarchy or a familial hierarchy.

15. The computer system of claim 14, wherein the method further comprises:

maintaining a history of prior-performed commands and resulting controls of AV functions based thereon, the history comprising weights assigned to the prior-performed commands; and decaying, over time, the weights assigned to the prior-performed commands according to one or more rates of decay, wherein a rate of decay of a weight assigned to a prior-performed command, of the prior-performed commands, input by a user is lower if the user is present in the AV as compared to if the user is not present in the AV;

wherein the determining whether to perform the command to control the function of the AV comprises:

determining that the command to control the function of the AV attempts to update one or more prior-performed commands;

comparing a weight of the command to one or more weights of the one of more prior-performed commands; and based on the comparing, making the determination whether to perform the command to control the function of the AV.

16. A computer program product comprising:

a computer readable storage medium readable by a processing circuit and storing instructions for execution by the processing circuit for performing a method comprising:

receiving occupant identification data from one or more devices of an autonomous vehicle (AV) and identifying one or more occupants of the AV based on the received occupant identification data;

based on identifying the one or more occupants of the AV, determining a respective prioritization level for each occupant of the one or more occupants of the AV, the prioritization level for each occupant dictating priority of the AV in performing commands provided to the AV by that occupant to control AV functions;

receiving, from an occupant of the one or more occupants of the AV, input of a command for performance by the AV to control a function of the AV;

determining whether to perform the command to control the function of the AV based on the prioritization level for the occupant; and performing processing based on the determining whether to perform the command;

wherein determining the prioritization level for an occupant of the one or more occupants of the AV comprises identifying a hierarchical ranking of the occupant relative to other individuals in a hierarchy, wherein the determined prioritization level for the occupant is dictated at least in part by the identified hierarchical ranking, and wherein the hierarchical ranking comprises a ranking of the occupant selected from an organizational hierarchy or a familial hierarchy.

17. The computer program product of claim 16, wherein the method further comprises:

maintaining a history of prior-performed commands and resulting controls of AV functions based thereon, the history comprising weights assigned to the prior-performed commands; and decaying, over time, the weights assigned to the prior-performed commands according to one or more rates of decay, wherein a rate of decay of a weight assigned to a prior-performed command, of the prior-performed commands, input by a user is lower if the user is present in the AV as compared to if the user is not present in the AV;

wherein the determining whether to perform the command to control the function of the AV comprises:

determining that the command to control the function of the AV attempts to update one or more prior-performed commands;

comparing a weight of the command to one or more weights of the one of more prior-performed commands; and based on the comparing, making the determination whether to perform the command to control the function of the AV.

* * * * *